US006307892B1

(12) United States Patent
Jones et al.

(10) Patent No.: US 6,307,892 B1
(45) Date of Patent: Oct. 23, 2001

(54) MULTICARRIER COMMUNICATION SYSTEM AND METHOD FOR PEAK POWER CONTROL

(75) Inventors: Alan Jones, Calne; Timothy Alan Wilkinson, Bristol, both of (GB)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 08/913,899

(22) PCT Filed: Jan. 17, 1997

(86) PCT No.: PCT/GB97/00159

§ 371 Date: Jan. 30, 1998

§ 102(e) Date: Jan. 30, 1998

(87) PCT Pub. No.: WO97/26743

PCT Pub. Date: Jul. 24, 1997

(30) Foreign Application Priority Data

Jan. 17, 1996 (GB) .................................................. 9600930

(51) Int. Cl.[7] .................................................. H04L 25/49

(52) U.S. Cl. ........................... 375/296; 375/285; 375/260

(58) Field of Search ..................................... 375/260, 284, 375/295, 296, 303, 305; 370/203; 395/278, 285

(56) References Cited

U.S. PATENT DOCUMENTS

| | | | |
|---|---|---|---|
| 3,898,566 | 8/1975 | Switzer et al. ...................... | 325/308 |
| 5,278,844 | * 1/1994 | Murphy et al. ...................... | 714/778 |
| 5,302,914 | * 4/1994 | Arntz et al. ........................... | 330/129 |
| 5,311,553 | * 5/1994 | Chennakeshu et al. ............. | 375/265 |
| 5,416,801 | * 5/1995 | Chouly et al. ....................... | 375/260 |
| 5,610,908 | * 3/1997 | Shelswell et al. ................... | 370/210 |
| 5,636,247 | * 6/1997 | Kamerman et al. ................. | 375/260 |
| 5,835,536 | * 11/1998 | May et al. ............................ | 375/260 |
| 6,125,103 | * 9/2000 | Bauml et al. ........................ | 370/203 |
| 6,128,351 | * 10/2000 | Jones et al. .......................... | 375/284 |
| 6,130,918 | * 10/2000 | Humphrey et al. .................. | 375/295 |

FOREIGN PATENT DOCUMENTS

| | | |
|---|---|---|
| WO 96/13918 | 5/1996 | (WO) . |
| WO 97/26743 | 7/1997 | (WO) . |

OTHER PUBLICATIONS

Ochiai, H.; Imai, H. "Forward Error Correction with Reduction of Peak to Average Power Ratio of QPSK Multicarrier Signals" Information Theory Proceedings, 1997 IEEE International Symp. on, 1997, pp. 120.*

Wilkinson, T.A.; Jones, A.E. "Minimisation of the Peak to Mean Envelope Power Ratio of Multicarrier Transmission Schemes by Block Coding" Vehic. Tech. Conf., 1995 IEEE 45th, vol. 2, 1995, pp. 825–829.*

Xiaodong Li; Ritcey, J.A. "M–sequences for OFDM peak–to–average power ratio reduction and error correction" Electronics Letters volume: 33 7, Mar. 27, 1997, pp. 554–555.*

(List continued on next page.)

Primary Examiner—Stephen Chin
Assistant Examiner—Chieh M. Fan
(74) Attorney, Agent, or Firm—Daniel W. Juffernbruch; Brian M. Mancini; Randall S. Vaas

(57) ABSTRACT

A communication device for simultaneously transmitting information on multiple sub-channels encodes information for each of the multiple sub-channels with a coding scheme to produce channel encoded information. A mask vector derived from a redundancy in the coding scheme, encodes the channel encoded information to transform the channel encoded information into codewords having pairwise Euclidean distance properties identical to those of the channel encoded information, Modulation of the sub-channels in accordance with the codewords in a modulator then produces a composite signal envelope having a peak-to-mean error power ratio (PMEPR) reduced relative to a PMEPR for correspondingly modulated channel encoded information.

23 Claims, 3 Drawing Sheets

OTHER PUBLICATIONS

Bauml, R.W.; Fischer, R.F.H.; Huber, J.B. "Reducing the peak–to–average power ratio of multicarrier modulation by selected mapping" Electronics Letters vol. 32 22, Oct. 24, 1996, pp. 2056–2057.*

Tellambura, C. "Upper bound on peak factor of N–multiple carriers" Electronics Letters vol.: 33 19, Sep. 11, 1997, pp. 1608–1609.*

Kamerman, A.; Krishnakumar, A.S. "OFDM encoding with reduced crestfactor" Communications and Vehicular Technology in the Benelux, 1994, IEEE Second Symposium on, 1994, pp. 182–186.* van Nee, R.D.J. "OFDM codes for peak–to–average power reduction and error correction" Global Telecommunications Conf., 1996. Globecom '96. vol. 1, 1996, pp. 740–744.*

Van Eetvelt, P.; Wade, G.; Tomlinson, M. "Peak to average power reduction for OFDM schemes by selective scrambling" Electronics Letters vol.: 32 21, Oct. 10, 1996, pp. 1963–1964.*

Jones et al, "Block coding scheme for reduction of peak to mean envelope power ratio of multicarrier transmission schemes", Electronic Letters, vol. 30 No. 25, pp. 2098–2099, published Dec. 8, 1994.*

Jones et al., "Blocking coding scheme for reduction of peak to mean envelope power ratio of multicarrier transmission schemes", *Electronics Letters*, vol. 30, No. 25, pp. 2098–2099.

Shepard et al., "Simple coding scheme to reduce peak factor in QPSK multicarrier modulation", *Electronics Letters*, vol. 31, No. 14, pp. 1131–1132.

Wilkinson et al., "Minimisation of the Peak to Mean Envelope Power Ratio of Multicarrier Transmission Schemes by Block Coding", *IEEE Proceedings of the Vehicular Technology Conference*, Jul. 25–28, 1995, pp. 825–829.

Gimlin, D. et al., "On Minimizing the Peak–to–Average Power Ratio for the Sum of $N$ Sinusoids", *IEEE Transactions on Communications*, vol. 41, No. 4, Apr. 1993, pp. 631–635.

Narahashi, S. et al., "New Phasing Scheme of $N$–Multiple Carriers for Reducing Peak–to–Average Power Ratio", *Electronics Letters*, vol. 30, No. 17, Aug. 18, 1994, pp. 1382–1383.

Popovic, B., "Synthesis of Power Efficient Multitone Signals with Flat Amplitude Spectrum", *Signal Processing V: Theories and Applications*, Proceedings of EUSIPCO–90, Sep. 18–21, 1990, pp. 489–492.

Van Eetvelt, P. W. J. et al., "The Distribution of Peak Factor in QPSK Multi–Carrer Modulation", *Wireless Personal Communications*, vol. 2, No. 87–96, 1995, pp. 87–96.

* cited by examiner

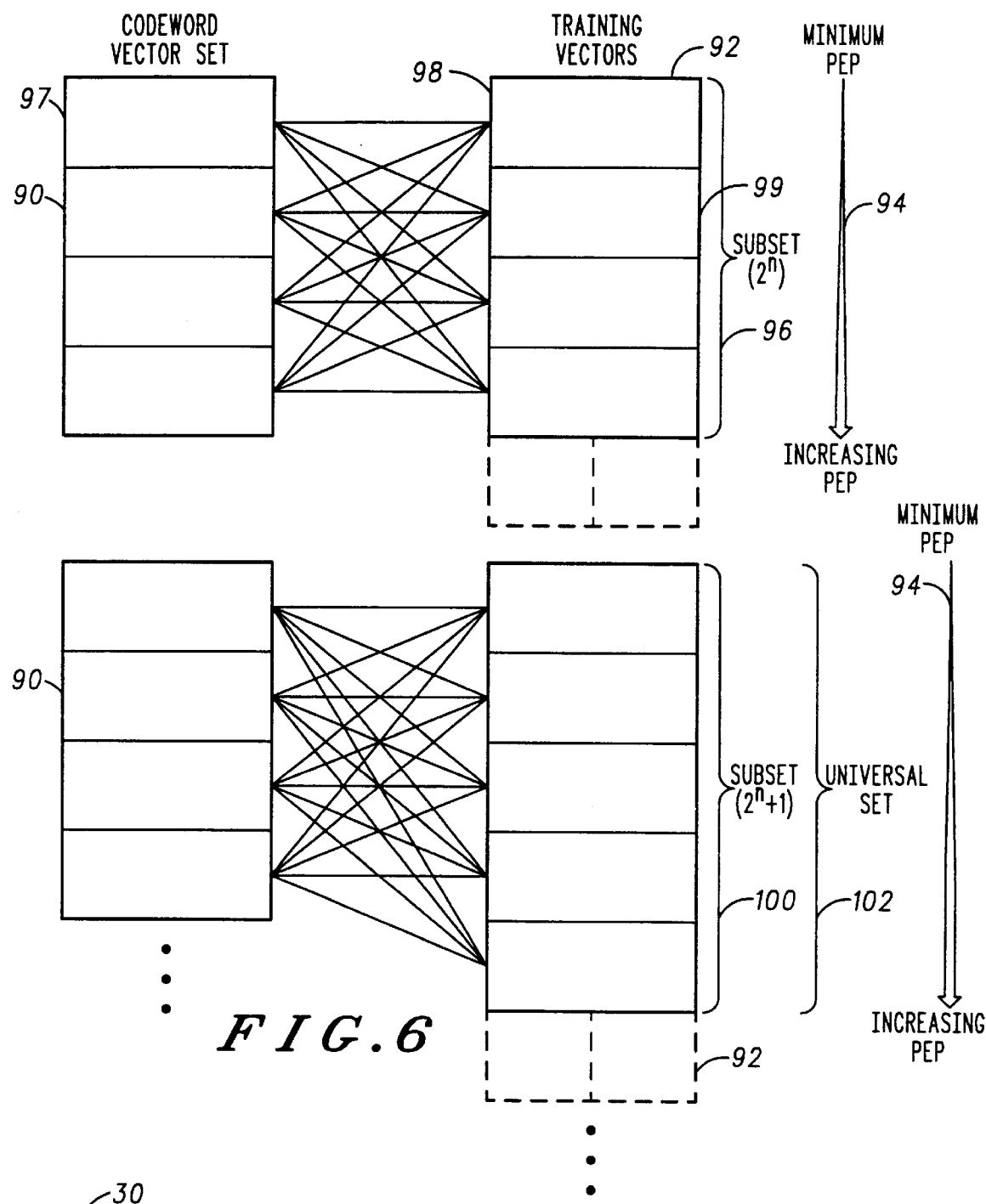
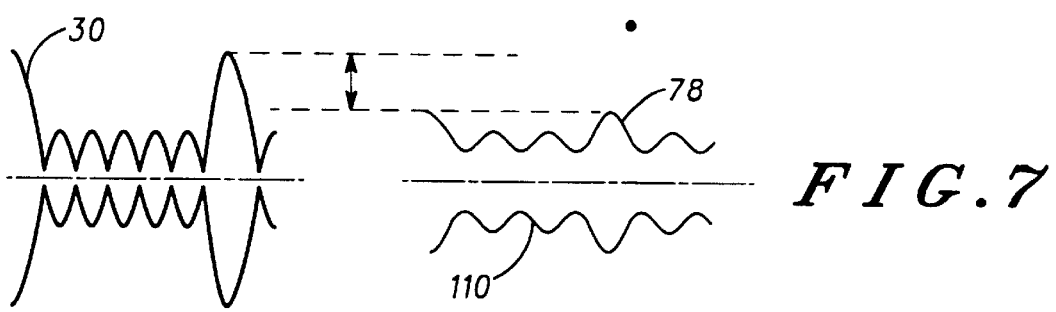
FIG.6
FIG.7

MULTICARRIER COMMUNICATION SYSTEM AND METHOD FOR PEAK POWER CONTROL

BACKGROUND OF THE INVENTION

This invention relates, in general, to multicarrier communication systems, such as an Orthogonal Frequency Division Multiplexed (OFDM) communication system, and is particularly applicable to a mechanism for controlling the peak-to-mean envelope power ratio (PMEPR) for transmissions in such systems.

SUMMARY OF THE PRIOR ART

Multicarrier transmission schemes, such as OFDM, have been proposed for many different types of communication system, including Digital Audio Broadcasting (DAB) and broadband wireless Local Area Networks (LANs). The advantage of such schemes is that unlimited transmission rates are theoretically possible in highly time dispersive channels that arise from a summation of multiple delayed, attenuated and phase-shifted paths for a signal, and which therefore display a distorted characteristic. Unfortunately, the composite signal envelope produced by OFDM exhibits a high PMEPR (which term is also commonly referred to as "the crest factor"). Moreover, in order to mitigate against the effects of distortion and spectral spreading (e.g. adjacent channel splatter) in multicarrier systems, a linear (and consequently inefficient) transmit amplifier is required for amplification of this composite signal envelope.

In addition to the foregoing disadvantages, the average power of a multicarrier signal (for a specified Peak Envelope Power (PEP) limit) is considerably lower than that for a constant envelope, single carrier signal (such as a Gaussian Minimum Shift-Keyed (GMSK) signal used in cellular communication systems, for example). Consequently, the selection of a multicarrier transmission scheme for a system does not currently utilize the available power range to a maximum extent.

As such, there is a desire to reduce the PMEPR of multicarrier transmission schemes in order to obtain the inherent advantages associated with the use of multicarrier signals in the limited frequency spectrum available to communication systems, generally.

SUMMARY OF THE INVENTION

According to a first aspect of the present invention there is provided a communication device for simultaneously transmitting information on multiple sub-channels, the communication device comprising: means for encoding the information for each of the multiple sub-channels with a first coding scheme, said first coding scheme incorporating a second coding scheme and a transformation derived from redundancy in the second coding scheme, said first coding scheme producing codewords having pairwise Euclidean distance properties corresponding to those of the same information encoded by said second coding scheme alone, and said transformation being selected so that a modulated composite signal envelope derived from said codewords has a peak-to-mean envelope power ratio (PMEPR) reduced relative to a PMEPR for correspondingly modulated information encoded by said second coding scheme alone; and modulation means for modulating said sub-channels in accordance with said codewords to produce a composite signal envelope.

The encoding means may comprise: first encoding means for encoding the information for each of the multiple sub-channels with said second coding scheme to produce channel encoded information; and second encoding means for encoding the channel encoded information for each of the multiple sub-channels with said transformation, said transformation transforming the channel encoded information into codewords having pairwise Euclidean distance properties corresponding to those of the channel encoded information.

In a preferred embodiment, the transformation is a function of the information encoded by said second coding scheme alone and a set of training vectors which is obtained from an associative map having a ranking in ascending order of peak envelope power; and the transformation may comprise symbol-wise addition modulo-v of a constant mask vector to information encoded by said second coding scheme, where $0, 1, \ldots, v-1$ represent possible values for each symbol in the encoded information.

In another aspect of the present invention there is provided a method of simultaneously transmitting information on multiple channels comprising the steps of: encoding the information for each of the multiple sub-channels with a first coding scheme, said first coding scheme incorporating a second coding scheme and a transformation derived from redundancy in the second coding scheme, said first coding scheme producing codewords having pairwise Euclidean distance properties corresponding to those of the same information encoded by said second coding scheme alone, and said transformation being selected so that a modulated composite signal envelope derived from said codewords has a peak-to-mean envelope power ratio (PMEPR) reduced relative to a PMEPR for correspondingly modulated information encoded by said second coding scheme alone; and modulating the sub-channels in accordance with said codewords to produce a composite signal envelope.

The encoding step may comprise: encoding the information for each of the multiple sub-channels with said second coding scheme to produce channel encoded information; and encoding the channel encoded information for each of the multiple sub-channels with said transformation, said transformation transforming the channel encoded information into codewords having pairwise Euclidean distance properties corresponding to those of the channel encoded information.

The present invention advantageously provides a mechanism which can achieve significant improvements in PMEPR by encoding the transmitted sequence in such a way as to avoid excessive PEPs.

BRIEF DESCRIPTION OF THE DRAWINGS

Exemplary embodiments of the present invention will now be described with reference to the accompanying drawings, in which:

FIG. 6 illustrates a process (in accordance with a preferred embodiment of the present invention) by which a mask vector is calculated for use in the multicarrier transceiver of FIG. 4; and FIG. 7 is a graphical representation contrasting a time domain representation of a waveform utilized by the multicarrier transceiver of FIG. 4 with the time domain signal of the multicarrier system of FIG. 2.

DETAILED DESCRIPTION OF A PREFERRED EMBODIMENT

Figure 1:
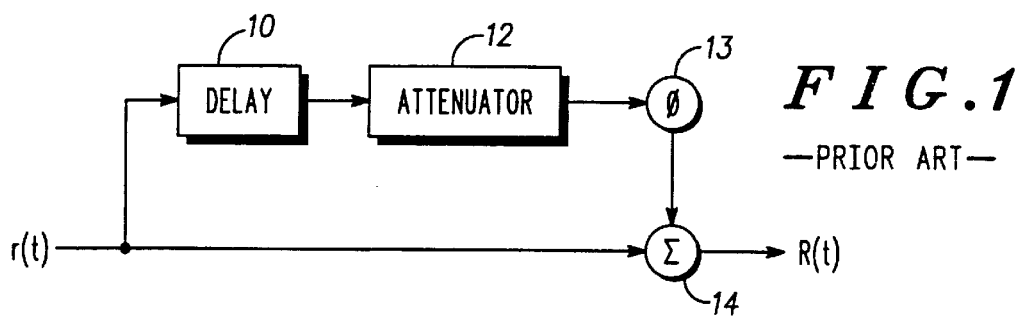
FIG. 1 is a physical representation of the mechanism by which a prior art time dispersive channel is formed.

Referring to FIG. 1, there is shown a physical representation of the mechanism by which a prior art time dispersive channel is formed. Explicitly, a data signal r(t) is subjected to a multiplicity of paths (only two of which are shown), one of which contains a time delay 10, an attenuator 12 and a phase offset 13. At a later point, the multiplicity of alternate paths are combined (as represented by summation block 14) to obtain a distorted signal R(t). As will be understood, as the bandwidth for the data signal r(t) increases, the period of the time delay affects the signal to a greater extent, and so limits the use of an available bandwidth.

Figure 2:
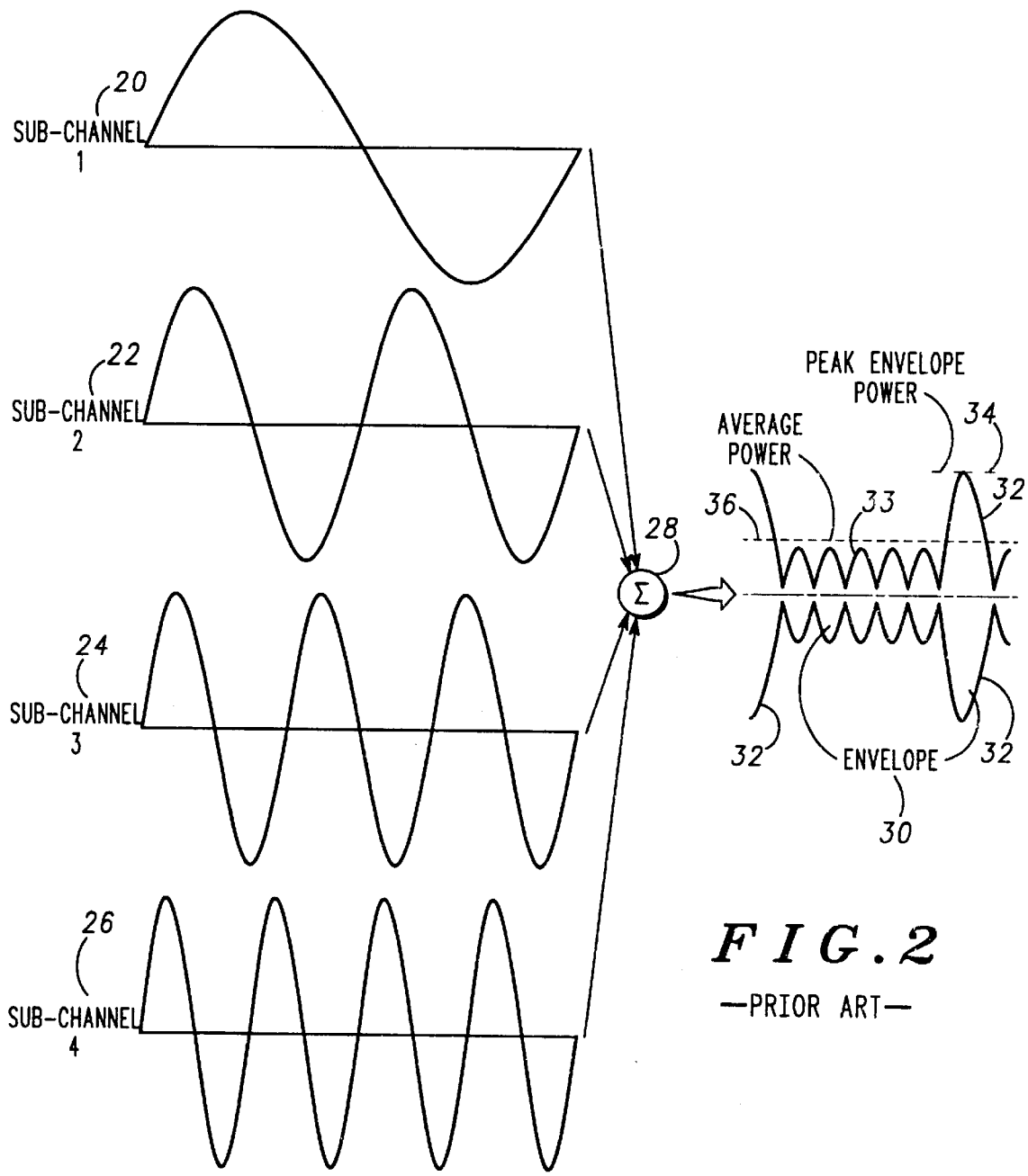
FIG. 2 is a waveform diagram illustrating the formulation of a time domain signal of a prior art multicarrier system.

FIG. 2 is a waveform diagram illustrating the formulation of a time domain signal of a prior art multicarrier system. Indeed, FIG. 2 is representative of an OFDM scheme in which the effects of the time delay are mitigated against by distributing data (not shown) amongst a plurality of frequency sub-channels 20–26 (four sub-channels in this particular instance). Typically, a frequency relationship exists between the frequency of a first sub-channel (sub-channel 1) and the other sub-channels in the scheme, e.g. sub-channel 2 is twice the frequency of sub-channel 1, while sub-channel 3 has thrice the frequency of sub-channel 1 (and so on). Distribution of data in this fashion has the effect that each sub-channel is less susceptible to the inherent delay spread, as will be understood. Superposition of individual signals from each sub-channel (occurring in summation block 28) therefore produces a composite envelope 30 having power spikes 32 separated by a relatively low (but oscillating) signal profile 33. However, the power spikes 32 have a peak envelope power (PEP) 34 substantially greater in value than an average power level 36 for the entire composite envelope 30.

Figure 3:
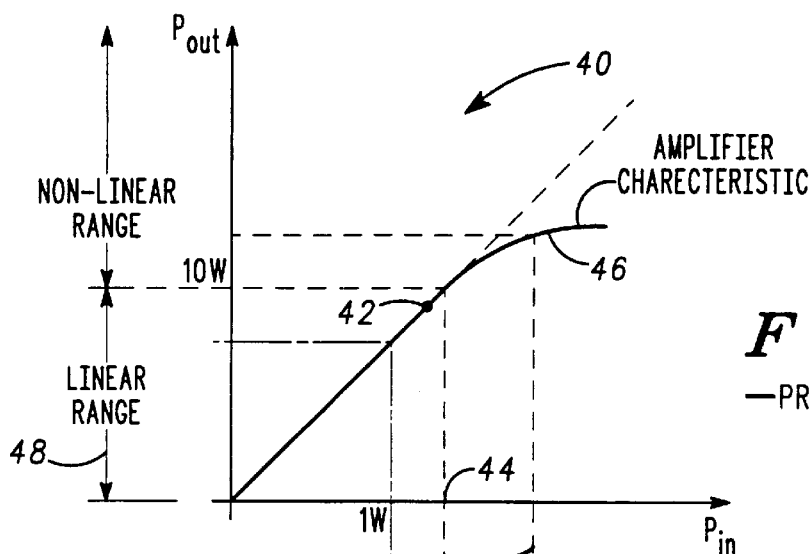
FIG. 3 shows an operating characteristic and operating point of a typical linear amplifier for the time domain signal of the multicarrier system of FIG. 2.

Turning now to FIG. 3, an operating characteristic 40 and operating point 42 of a typical linear amplifier (not shown) for the time domain signal of the multicarrier system of FIG. 2 is shown. As will be appreciated, a linear amplifier provides a limited, linear gain between an input signal and an output signal. At a certain input power ($P_{in}$) threshold 44, non-linearities 46 in the amplification occur. In order to optimize the use of the linear amplifier in, for example, communication systems requiring linear transmitters (or the like), an input signal (in this case the time domain representation of the composite signal envelope 30) is positioned about the operating point 42. More particularly, the composite signal envelope 30 is arranged such that its average power level 36 provides (when taking into account the gain of the amplifier) a desired output level, and whereby a majority of the signal envelope 30 is within a linear range 48 of the amplifier. Unfortunately, the PEP 34 of power spikes 32 exceeds the linear range of operation of the amplifier with the effect that information contained therein is distorted by the non-linearity 46 of the amplifier. More crucially though, standards bodies, such as ETSI (the European Technical Standards Institute) may require operational compliance to a specified maximum transmit power output level, say 10 watts. Therefore, to accommodate the relatively high (but relatively infrequent) PEPs of the power spikes 32, the input signal (composite signal envelope 30) requires the re-positioning of the operating point 42 to a lower level, whereby the amplification of the average transmit power is reduced and the range of the transmitter (in which the linear amplifier is used) diminished accordingly.

Figure 4:
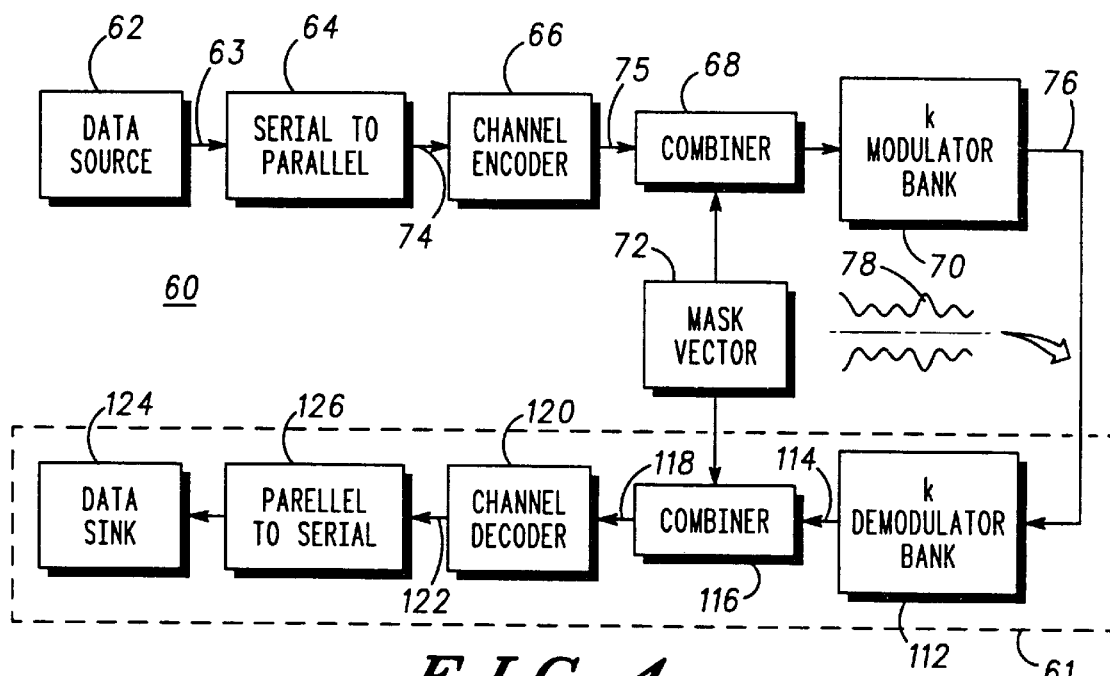
FIG. 4 is a block diagram of a multicarrier transceiver in accordance with a preferred embodiment of the present invention.

Although FIG. 4 is a block diagram of a multicarrier transceiver 60 constructed in accordance with the present invention, it will be appreciated that the present invention is not limited to bidirectional communication devices, and that a multicarrier transmitter can be considered as a physically separate device from a multicarrier receiver (which may principally comprise a combination of the circuitry shown enclosed within the broken outline 61 and a transformation in the form of a mask vector, the function of which will be described subsequently).

The multicarrier transmitter comprises a data source 62 for generating a stream of data 63, a serial-to-parallel converter 64, a channel encoder 66, a combiner 68, a bank of k identical modulators 70 and a mask vector 72 (stored in a memory). In this example, the data source generates a stream of data symbols each of which can have any one of the logical values 0, 1, . . . , v−1, where v is an integer greater than one; in the described embodiment, v=2, i.e. the data source generates binary data. The logical values may be represented by physical values, such as voltage levels or signal phases, in any conventional manner. These logical values can be represented as points on the unit circle in the complex plane in the form $s=e^{j\phi}$, where $j=\sqrt{-1}$ and $\phi$ takes the respective values $$\frac{2\pi \cdot 0}{v}, \frac{2\pi \cdot 1}{v}, \ldots, \frac{2\pi \cdot (v-1)}{v}$$

For example, when v=4, the logical values 0, 1, 2 and 3 can be represented by respective complex values 1, j, −1 and −j. In the general case, the logical values need not be restricted as above, i.e. they may have arbitrary complex values of the form $$s=m.e^{j\phi}$$

where m represents arbitrary magnitude and $\phi$ represents arbitrary phase.

The serial-to-parallel converter 64 is responsive to the data stream 63 and converts the data stream 63 into parallel data words 74, which in turn are input into the channel encoder 66 for block encoding to facilitate error control. Codeword vectors 75 that are output from the channel encoder 66 are transformed by the mask vector 72 in the combiner 68, and then an output from the combiner 68 is applied to the bank of k identical modulators 70 to produce, ultimately, an output signal 76 having a composite signal envelope 78 suitable for transmission. Each modulator in the bank of k modulators 70 is assigned to a particular sub-channel frequency, while a spacing between sub-channels is orthogonal, i.e. there is no interference between sub-channels (carriers). Operational control of the multicarrier transmitter (transceiver or receiver) is performed by a microprocessor (not shown), as will be readily understood.

Figure 5:
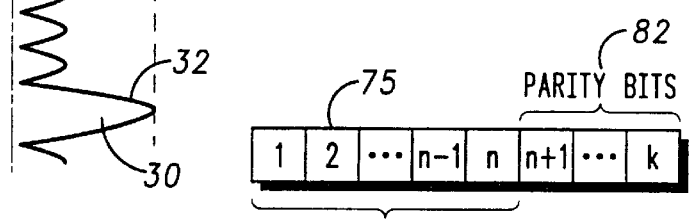
FIG. 5 represents a codeword vector generated in the multicarrier transceiver of FIG. 4.

Referring briefly to FIG. 5, a format for the codeword vectors 75 is shown. Each codeword vector 75 comprises k binary digits (bits) that are attributed as n information bits 80 and k−n parity check bits 82, with the length of the codeword vector 75 defining the number of sub-channels (carriers) and hence the number of modulators used in the multicarrier transmission. The codeword vectors 75 and the mask vector 72 are of identical length, namely k bits. The k−n parity bits are provided by the channel encoding process.

The composite envelope 78 of the multicarrier signal can be expressed mathematically as:

$$u(t) = \sqrt{r(t)r^*(t)}$$

in which the transmitted signal is $$r(t) = \sum_{i=1}^{k} s_i(t) e^{2\pi j f_i t}$$

and r*(t) is the complex conjugate; $s_i(t)$ is the parallel data of the ith carrier; and $f_i$ is the frequency of the ith carrier. The envelope power is $u(t)^2$.

As will be appreciated, linear block codes, such as those contemplated in the context of the present invention, necessarily include the all-zeros codeword. This codeword produces the largest possible PEP for an OFDM system. In order to avoid this PEP (and the problems associated with its periodic appearance), the described embodiment of the present invention combines respective bits of the codeword vector 75 through bitwise addition modulo 2 with corresponding bits in the mask vector 72 prior to modulation, and therefore provides pre-processing of the data to produce a reduced PMEPR in the output signal 76. In the case where v>2, the addition is performed symbol-wise modulo-v. In the general case ($s = m.e^{j\Phi}$), the combination is performed by the symbol-wise multiplication of the codeword vector 75 and the mask vector 72 represented in complex form.

More particularly, it has been recognized that since the number n of information bits 80 in the codeword vector 75 is fixed (by the robustness offered by the parity bits of the code selected for the system, e.g. a Golay code compared against a Hamming code), the number of possible codeword vectors 75 is finite, namely $2^n$. However, the number of combinations for the mask vectors is $2^k$, which number of combinations is usually very much greater. The mask vector 72 is therefore selected so as not to coincide with any of the possible codeword vectors 75, and its addition does not resemble the all-zero case in the modulation domain. Indeed, the present invention makes use of the redundancy provided by the inclusion of the parity check bits in the coding scheme; that is, one of the additional words (which are made available by the inclusion of at least one parity check bit and which do not form a valid codeword vector) is used for the mask vector.

Although many techniques exist to determine the similarities between two vectors (e.g. correlation), the concept of minimizing Euclidean distance between two vectors is used in this embodiment of the present invention to assess selection of the mask vector 72. The Euclidean distance d between two k-bit complex vectors a=(a(1), a(2), a(3), . . . , a(k)) and b=(b(1), b(2), b(3), . . . , b(k)) is defined by:

$$d = \sum_{i=1}^{k} |a(i) - b(i)|$$

and will be denoted hereinafter as $$\|a - b\|$$

It will be understood that in deriving the Euclidean distance in the case of logical values 0 to v−1, these values must first be represented as points on the unit circle in the complex plane as described above.

FIG. 6 illustrates a process by which the mask vector 72 (a solitary data word of length k bits) is determined for use in the multicarrier transceiver of FIG. 4. Specifically, all $2^k$ possible k-bit vectors $p_i$ are generated and respective bits of these vectors $p_i$ are modulated by an appropriate modulator from the bank of k modulators 70 to obtain PEP values for each of the possible vectors $p_i$. The group 90 of the vectors $p_i$ comprising all $2^n$ codeword vectors 75 is disregarded, and the remaining group 92 of ($2^k - 2^n$) vectors $p_i$ is tabulated to produce an associative map that is ranked in order of PEP magnitude 94. From this ranked order of the remaining group 92 of vectors $p_i$, a subset 96 of the $2^n$ first (lowest) vectors $p_i$ is initially selected.

This subset 96 represents an initial subset of training vectors that potentially possess the exact same pairwise Euclidean Distance properties, but with a reduced PMEPR for the composite envelope 78, as the $2^n$ codeword vectors 75 generated by the channel encoder 66. (In the case of binary logical values preserving the pairwise Euclidean distance properties is equivalent to preserving pairwise Hamming distance properties).

In order to assess the similarity between the set of codewords 90 and subset 96, each codeword vector is modified by a test mask vector w that satisfies the equation:

$$w = P_i * c_h$$

for particular respective values of i and h, where i and h are indices and * indicates bitwise exclusive-OR (addition modulo-2), $c_h$ is the hth codeword vector and $p_i$ is a training vector in the subset 96. More particularly, if we consider (for exemplary purposes) a set of block codewords 90 consisting of four alternative codes, then the initial subset of training vectors 96 is arranged to contain four training vectors (having the four lowest PEP values). A first member 97 of the set of codewords vectors is mathematically combined (exclusive-ORed, in this embodiment) with a first member 98 of the subset of training vectors to generate a first test mask vector. The first test mask vector is then systematically applied to modify each of the four codewords vectors in an attempt to obtain zero values for Euclidean distance $d_{ih}$ between all modified codeword vectors and a permutation of all members of the initial subset 96 of training vectors, according to the equation:

$$d_{ih} = \|p_i - w * c_h\|$$

However, in the event that any non-zero Euclidean distance is recorded, the first test mask vector must be rejected, and a second test mask vector calculated from, perhaps, the same codeword vector used to calculate the first test mask vector in combination with a different training vector 99 from the subset 96 having the next lowest PEP value. The second test mask vector is then systematically applied to modify each of the four codeword vectors in an attempt to obtain a zero value for Euclidean distance between all modified codeword vectors and a permutation of all members of the initial subset of training vectors 96. Again, if a non-zero Euclidean distance is recorded, the second test mask vector is rejected and another (new) test mask vector generated. Clearly, with four codeword vectors and the initial subset of training vectors 96, sixteen possible test mask vectors may be systematically generated and applied in the hope of finding zero Euclidean distance (and hence a direct mapping) between all the modified codeword vectors and a permutation of all the training vectors. However, it may be that none of the sixteen possible test mask vectors produce a direct mapping and so it is necessary to increase the number of training vectors and therefore to generate a larger subset 100 containing ($2^n + 1$) training vectors. It is preferable that the larger subset is simply increased by the addition of the training vector having the next lowest PEP in the rank order. The search for the test mask vector that provides an all zero Euclidean distance result is then resumed with this enlarged subset 100. If necessary, the number of training vectors is again increased such that the size of the subset of training vectors approaches the size of universal set 102 of ($2^k$–$2^n$) possible training vectors. The mappings shown in FIG. 6 illustrate how the test mask vectors are derived and how they are applied to determine the mask vector 72.

It will now be appreciated that the test mask vector is constant for any group of calculations and is not modified until a non-zero Euclidean distance is noted. This is necessary for two reasons: first, the pairwise Euclidean distance properties of the block code must be maintained for all the possible codeword vectors 90; and second, only one mapping of the ch codeword vectors to the $p_i$ training vectors is required. Therefore, the first test mask vector encountered that maps the set of codeword vectors to a set of training vectors having identical pairwise Euclidean distance properties represents a desired transformation and is therefore nominated as the mask vector 72 for the system. Indeed, use of the mask vector ensures that the worst-case all zero codeword is never transmitted.

The described process for selecting the mask vector satisfies the following rule:

IF [the Euclidean distance is zero for all codewords]
  THEN [accept w as the optimum weight vector]
  ELSE [increase the size of the training set]
END To reduce computation it may be desired to select an initial subset comprising more than $2^n$ training vectors, and/or to increment the size of the training subset by more than one at a time; however, in these circumstances it is possible that the resulting PMEPR may be larger than the optimum value.

FIG. 7. is a graphical representation contrasting a time domain representation of a waveform utilized by the multicarrier transceiver of FIG. 4 with the time domain signal of the multicarrier system of FIG. 2. In contrast with the prior art time domain envelope 30, application of the mask vector 72 to each codeword vector 75 for each sub-channel has the effect of reducing the PMEPR. The new composite signal envelope 78 has reduced PEP spikes that are separated by a region having a new signal profile 110 that experiences less extreme excursions than that of the prior art composite signal envelope 30.

Use of the coding scheme of the present invention advantageously permits the use of linear amplifiers in a more efficient manner, since the PEP value of the composite signal envelope is reduced and the peak-to-peak variation in power of the composite signal envelope is corresponding reduced. These reductions in the power profile of the envelope provide the ability to operate the amplifier at an operating point towards its non-linear range, and do not require clipping of the amplifier. Furthermore, for a specific regulatory peak power limit, there is an increase in a transmitting range for a transmitter utilizing the present invention, since the average power in the composite signal envelope is increased. Also, use of the coding scheme of the present invention does not degrade spectral efficiency because the mask vector is derived from coding redundancy and is part of the modulation. Therefore, no additional information-bearing sub-carrier sub-channels are required.

In addition, the segmentation of broadband data and its transmission over multiple, narrow-band carriers (sub-channels) eliminates the need for high speed equalizers in communication systems.

Referring again to FIG. 4, there is shown a multicarrier receiver 62 according to the preferred embodiment of the present invention. The multicarrier receiver is arranged to receive a multicarrier signal 76 having a composite signal envelope 78. The received signal 76 is applied to a bank of k identical demodulators 112, with each demodulator in the bank of k demodulators 112 assigned to a particular sub-channel frequency. The mask vector 72 (used for transmission) is applied, in combiner 116, to signals 114 emanating from the bank of k demodulators 112 in order to decode the signals 114 into a signal format 118 suitable for channel decoding in channel decoder 120. Channel decoded signals 122 from the channel decoder 120 are ultimately provided to a data sink 124, such as a visual display or audio circuitry, in a parallel or serial format. In the latter instance, a parallel-to-serial converter 126 is positioned between the channel decoder 120 and the data sink 124. Operational control of the multicarrier receiver 61 is performed by a microprocessor (not shown), as will be readily understood.

In an alternative embodiment of the receiver 61 of the present invention, the combiner 116 may be omitted provided that there is synchronization via a packet header (which is analogous to a midamble synchronization sequence transmitted in a time-slot of GSM, for example). The presence of this synchronization can be used to remove channel phase offset (or rotation) introduced to the information signal 78 by the mask vector 72, as will be understood. More explicitly, a synchronization sequence that is therefore necessarily utilized in the demodulator 112 is predetermined such that the mask vector 72 appears as part of the time dispersive channel (shown in FIG. 1), with the result that the synchronization and the effect of the mask vector are removed during demodulation. Consequently, no additional processing is required in the receiver, and migration to the coding scheme offered by the present invention would not involve re-design of current receivers.

It will, of course, be understood that the above description has been given by way of example only and that modifications in detail may be made within the scope of the invention. For example, the mask vector has to be determined once only, and in effect constitutes a fixed transformation of the code implemented in the channel encoder 66. Accordingly, the mask vector can be combined with each codeword in the code in advance, and the resulting transformed codewords stored in the channel encoder 66. The channel encoder would then encode the data stream 63 and apply the mask vector in a single, combined operation, and the combiner could be omitted. A similar modification could be made in the receiver 61. Although the above description discusses the invention in the general context of a radio transmission, it will be appreciated that the multicarrier system may utilize fiber-optic technology as a communication resource for the multiple information carriers. Additionally, although the training vectors of the preferred embodiment are arranged in rank order by PEP magnitude 94, it is considered that the function of modulation provided to the channel coding by this ranking is supplemental to the advantages and benefits derived by the coding of individual sub-channels of the multicarrier system with a mask vector derived from the inherent coding redundancy. As such, it is possible that the mask vector may not be optimized to produce a composite signal envelope with the lowest possible PMEPR, although the composite signal envelope will have an improved PMEPR.

What is claimed is:

1. A communication device for simultaneously transmitting information on multiple sub-channels, the communication device comprising:

an encoder circuit to encode the information for each of the multiple subchannels with a first coding scheme, said first coding scheme produced from a transformation of a second coding scheme, the transformation derived from redundancy in the second coding scheme, said first coding scheme producing codewords having pairwise Euclidean distance properties corresponding to those of the same information encoded by said second coding scheme alone, and said transformation being selected so that a modulated composite signal envelope derived from said codewords has a peak-to-mean envelope power ratio (PMEPR) reduced relative to a PMEPR for correspondingly modulated information encoded by said second coding scheme alone; and a modulator bank operatively coupled to said encoder circuit for modulating said sub-channels in accordance with said codewords to produce a composite signal envelope.

2. A communication device of claim 1, wherein said encoder circuit transforms using the transformation as a function of the information encoded by said second coding scheme alone and a set of training vectors which is obtained from an associative map having a ranking in ascending order of peak envelope power.

3. A communication device of claim 1, wherein said encoder circuit transforms using the transformation which comprises symbol-wise addition modulo-v of a constant mask vector to information encoded by said second coding scheme, where $0, 1, \ldots, v-1$ represent possible values for each symbol in the encoded information.

4. A communication device of claim 1, wherein said encoder circuit comprises:

a first encoder for encoding the information for each of the multiple sub-channels with said second coding scheme to produce channel encoded information; and a second encoder operatively coupled to said first encoder for encoding the channel encoded information for each of the multiple sub-channels with said transformation, said transformation transforming the channel encoded information into codewords having pairwise Euclidean distance properties corresponding to those of the channel encoded information.

5. A communication device of claim 4, wherein said second encoder transforms using the transformation as a function of the information encoded by said second coding scheme alone and a set of training vectors which is obtained from an associative map having a ranking in ascending order of peak envelope power.

6. A communication device of claim 4, wherein said second encoder transforms the transformation which comprises symbol-wise addition modulo-v of a constant mask vector to information encoded by said second coding scheme, where $0, 1, \ldots, v-1$ represent possible values for each symbol in the encoded information.

7. A communication device of claim 1, wherein said encoder circuit provides the second coding scheme using a linear error-correcting code.

8. A communication device of claim 1, wherein said encoder circuit produces the codewords as binary-symbol codewords.

9. A communication device of claim 1, wherein the multiple sub-channels comprise orthogonal frequency division multiplex channels.

10. A communication device of claim 1, wherein the communication device is a radio communication device.

11. A method of simultaneously transmitting information on multiple channels comprising the steps of:

encoding the information for each of the multiple sub-channels with a first coding scheme, said first coding scheme incorporating a second coding scheme and a transformation derived from redundancy in the second coding scheme, said first coding scheme producing codewords having pairwise Euclidean distance properties corresponding to those of the same information encoded by said second coding scheme alone, and said transformation being selected so that a modulated composite signal envelope derived from said codewords has a peak-to-mean envelope power ratio (PMEPR) reduced relative to a PMEPR for correspondingly modulated information encoded by said second coding scheme alone; and modulating the sub-channels in accordance with said codewords to produce a composite signal envelope.

12. A method of claim 11, wherein the transformation is a function of the information encoded by said second coding scheme alone and a set of training vectors which is obtained from an associative map having a ranking in ascending order of peak envelope power.

13. A method of claim 11, wherein the transformation comprises symbol-wise addition modulo-v of a constant mask vector to information encoded by said second coding scheme, where $0, 1, \ldots, v-1$ represent possible values for each symbol in the encoded information.

14. A method of claim 11, wherein the encoding step comprises:

first encoding the information for each of the multiple sub-channels with said second coding scheme to produce channel encoded information; and second encoding the channel encoded information for each of the multiple sub-channels with said transformation, said transformation transforming the channel encoded information into codewords having pairwise Euclidean distance properties corresponding to those of the channel encoded information.

15. A method of claim 14, wherein the transformation is a function of the information encoded by said second coding scheme alone and a set of training vectors which is obtained from an associative map having a ranking in ascending order of peak envelope power.

16. A method of claim 14, wherein the transformation comprises symbol-wise addition modulo-v of a constant mask vector to information encoded by said second coding scheme, where $0, 1, \ldots, v-1$ represent possible values for each symbol in the encoded information.

17. A method of claim 11, wherein the second coding scheme uses a linear error-correcting code.

18. A method of claim 11, wherein the codewords are binary-symbol codewords.

19. A method of claim 11, wherein the multiple sub-channels comprise an orthogonal frequency division multiplex.

20. A method of claim 11, wherein the multiple sub-channels are radio communication sub-channels.

21. A communication device for simultaneously transmitting information on multiple sub-channels, the communication device comprising:

an encoder circuit to encode according to a first coding scheme the information for transmission in multiple sub-channels, said encoder circuit producing codewords encoded according to said first coding scheme from a transformation of data encoded according to a second coding scheme, said transformation comprising a transformation vector derived from a redundancy in said second coding scheme, said transformation produced codewords having pairwise Euclidean distance properties corresponding to those of the same information encoded by said second coding scheme alone, and said transformation vector being selected so that a modulated composite signal envelope derived from said codewords has a peak-to-mean envelope power ratio (PMEPR) reduced relative to a PMEPR for correspondingly modulated information encoded by said second coding scheme alone; and a modulator bank operatively coupled to said encoder circuit for modulating said sub-channels in accordance with said codewords to produce a composite signal envelope.

22. The communication device according to claim 21, including a combiner to combine the encoded data according to said second coding scheme with said transformation vector to produce data encoded according to said first coding scheme.

23. The communication device according to claim 22, wherein the modulator bank is coupled to the combiner, said modulator bank modulating the data encoded according to said first coding scheme for transmission on the multiple transmission channels.

* * * * *

UNITED STATES PATENT AND TRADEMARK OFFICE
CERTIFICATE OF CORRECTION

PATENT NO. : 6,307,892 B1
DATED : October 23, 2002
INVENTOR(S) : Jones, Alan et al.

It is certified that error appears in the above-identified patent and that said Letters Patent is hereby corrected as shown below:

<u>Title page,</u>
Item [73], Assignee, please add second Assignee:

-- Hewlett Packard Company, Fort Collins, CO (US) --

Signed and Sealed this

Second Day of September, 2003

JAMES E. ROGAN
*Director of the United States Patent and Trademark Office*